United States Patent
Bedford et al.

(12)

(10) Patent No.: US 6,830,609 B2
(45) Date of Patent: Dec. 14, 2004

(54) POLISHES AND THEIR USE

(75) Inventors: David Bedford, Hull (GB); Jean Anne Braithwaite, Hull (GB)

(73) Assignee: Rocklin Benckiser (UK) Limited, Slough (GB)

(*) Notice: Subject to any disclaimer, the term of this patent is extended or adjusted under 35 U.S.C. 154(b) by 0 days.

(21) Appl. No.: 10/332,201

(22) PCT Filed: Jul. 2, 2001

(86) PCT No.: PCT/GB01/02978

§ 371 (c)(1),
(2), (4) Date: May 6, 2003

(87) PCT Pub. No.: WO02/02708

PCT Pub. Date: Jan. 10, 2002

(65) Prior Publication Data

US 2003/0167963 A1 Sep. 11, 2003

(30) Foreign Application Priority Data

Jul. 4, 2000 (GB) ............................................. 0016412

(51) Int. Cl.[7] .............................................. C09G 1/04
(52) U.S. Cl. ....................................... 106/10; 106/271
(58) Field of Search ................................... 106/10, 271

(56) References Cited

U.S. PATENT DOCUMENTS

| 3,395,028 A | | 7/1968 | Mackles ........................ 106/8 |
| 3,959,530 A | | 5/1976 | Kaliardos .................... 427/341 |
| 4,464,499 A | * | 8/1984 | Umemoto et al. .......... 524/230 |

FOREIGN PATENT DOCUMENTS

| GB | 755794 | 8/1956 |
| GB | 875858 | 8/1961 |
| GB | 925405 | 5/1963 |
| GB | 1 532 869 | 11/1978 |

OTHER PUBLICATIONS

PCT International Search Report, dated Oct. 22, 2001, for PCT/GB01/02978.
GB Search Report, dated Dec. 6, 2000, for GB 0016412.9.

* cited by examiner

*Primary Examiner*—David Brunsman
(74) *Attorney, Agent, or Firm*—Norris McLaughlin & Marcus PA

(57) ABSTRACT

This invention relates to a furniture polish comprising a paraffin wax and a microcrystalline wax, preferably in combination wit beeswax and a silicon oil. An organic solvent and water are present, and there may additionally be a surfactant and, in aerosol can applications, a propellant. The polish gives good gloss without tendency to smearing and good resistance to water damage.

14 Claims, No Drawings

POLISHES AND THEIR USE

This application is a 371 filing of PCT/GB01/02978.

The present invention relates to polishes. In particular, the present invention relates to furniture polishes for porous surfaces, such as wood surfaces, the polishes having good gloss and water protection properties.

Wood products such as furniture are popular and are present in the majority of households. Because of the nature and the expense of wood furniture, furniture polishes are widely used to clean and polish the furniture to protect it and prolong the life of the wood.

Preferable qualities of furniture polishes are that they should give a good gloss to the surface on which they are applied, that they should not give smear marks which are detrimental to the appearance of furniture and that they should remove dust and dirt from the surface. In addition, the polishes should be easy to use and not require excessive effort to polish the surface to give a shine.

In addition to the above, it has for some time now been desirous to include water resistant ingredients in furniture polishes to prevent water marks, such as water rings, from forming on an item of wood furniture, for example, when a cold drink is placed on the furniture.

The addition of ingredients which improve the water penetration resistance of a furniture polish often result in detrimental effects on the other desired properties of the polish. For example, increasing the wax or silicone oil content may lead to increased smearing on the surface on the wood, and make the polish difficult to use.

A need exists for a furniture polish for porous surfaces, such as wood surfaces, which polish provides good water resistance whilst at the same time providing good smear resistance, gloss and ease of use properties.

To our considerable surprise we have determined that employing certain waxes in admixture results in a furniture polish able to meet these requirements. Furthermore, we have determined that such waxes may be present in appreciable amounts, with advantage.

According to a first aspect of the present invention there is provided a polish comprising a solvent, paraffin wax in an amount of from 0.3–4.5% w/w and microcrystalline wax in an amount of from 0.05–1% w/w.

The polish may suitably also include beeswax.

Paraffin waxes generally have a macrocrystalline structure and consist largely of n-alkanes of formula $C_{20}H_{42}$ and upwards, with some iso- and cycloalkanes.

Microcrystalline waxes, generally produced from heavy lubricating oil residues, have a microcrystalline structure and consist largely of iso- and cycloalkanes, with some aromatics.

Beeswax is usually a mixture of myricyl palmitate, cerotic acid and esters, and some paraffins.

Preferably, the total amount of waxes present in the polish is at least 0.4% w/w, more preferably at least 0.8% w/w, most preferably at least 1.0% w/w, and especially at least 1.2% w/w. Preferably, the total amount of waxes present in the polish is up to 5% w/w, more preferably up to 3% w/w, most preferably up to 2% w/w, and especially up to 1.6% w/w.

Preferably, the amount of paraffin wax(es) present in the polish is at least 0.3% w/w, more preferably at least 0.5% w/w, most preferably at least 0.7% w/w.

Preferably, the amount of paraffin wax(es) present in the polish is up to 4.5% w/w, more preferably up to 2% w/w, most preferably up to 1.5% w/w.

Preferably, the amount of microcrystalline wax(es) present in the polish is at least 0.05% w/w, more preferably at least 0.1% w/w, most preferably at least 0.2% w/w.

Preferably, the amount of microcrystalline wax(es) present in the polish is up to 1% w/w, more preferably up to 0.6% w/w, most preferably up to 0.4% w/w.

Preferably, the amount of beeswax, when present, in the polish is at least 0.05% w/w, more preferably at least 0.1% w/w, most preferably at least 0.2% w/w.

Preferably, the amount of beeswax, when present, in the polish is up to 1% w/w, more preferably up to 0.6% w/w, most preferably up to 0.4% w/w.

Preferably, the weight of the paraffin wax present exceeds that of the microcrystalline wax.

Preferably, when beeswax is present the weight of the paraffin wax exceeds that of the beeswax; indeed, the weight of the paraffin wax preferably exceeds the combined weight of the microcrystalline wax and the beeswax.

Preferably, there are no waxes present in the polish except for paraffin wax and microcrystalline wax and, when present, beeswax.

Preferably, the polish contains a silicone oil. The silicone oil may be a single type of oil or it may be a mixture of oils. Preferably the total silicone oil content is a mixture of different molecular weight silicone oils, for example a blend of silicone oils having molecular weights from 350 to 30,000, for example silicone 350, silicone 10,000 and silicone 30,000.

Preferably, the silicone oil(s) when present, may be present in an amount up to 10% w/w, more preferably up to 5% w/w. Preferably, the silicone oil(s) when present may comprise at least 1% w/w, preferably at least 2% w/w.

A surfactant may be included in the polish. A surfactant used in the present invention may be selected from anionic, cationic, nonionic, amphoteric or zwitteronic surface active agents.

One class of nonionic surfactants which may be used in the present invention are alkoxylated alcohols, particularly alkoxylated fatty alcohols. These include ethoxylated and propoxylated fatty alcohols, as well as ethoxylated and propoxylated alkyl phenols, both having alkyl groups of from 7 to 16, more preferably 8 to 13 carbon chains in length.

Examples of alkoxylated alcohols include certain ethoxylated alcohol compositions presently commercially available from the Shell Company, (Houston, Tex.) under the general trade name NEODOL (trade mark), which are described to be linear alcohol ethoxylates and certain compositions presently commercially available from the Union Carbide Company, (Danbury, Conn.) under the general trade name TERGITOL (trade mark), which are described to be secondary alcohol ethoxylates.

Examples of alkoxylated alkyl phenols include certain compositions presently commercially available from the Rhône-Poulenc Company (Cranbury, N.J.) under the general trade name IGEPAL (trade mark), which are described to be octyl and nonyl phenols.

Another class of non-ionic surfactants that may be used are sorbitan esters of fatty acids, typically of fatty acids having from 10 to 24 carbon atoms, for example sorbitan mono oleate.

Examples of anionic surface active agents which may be used in the present invention include but are not limited to: alkali metal salts, ammonium salts, amine salts, aminoalcohol salts or the magnesium salts of one or more of the following compounds: alkyl sulphates, alkyl ether sulphates, alkylamidoether sulphates, alkylaryl polyether sulphates, monoglyceride sulphates, alkylsulphonates, alkylamide sulphonates, alkylarylsulphonates, olefinsulphonates, paraffin sulphonates, alkyl sulfosuccinates, alkyl ether sulfosuccinates, alkylamide sulfosuccinates, alkyl sulfosuccinamate, alkyl sulfoacetates, alkyl phosphates, alkyl ether phosphates, acyl saronsinates, acyl isothionates and N-acyl taurates. Generally, the alkyl or acyl group in these various compounds comprises a carbon chain containing 12 to 20 carbon atoms.

Other anionic surface active agents which may be used include fatty acid salts, including salts of oleic, ricinoleic, palmitic and stearic acids; copra oils or hydrogenated copra oil acid, and acyl lactylates whose acyl group contains 8 to 20 carbon atoms.

Amphoteric surfactants which may be used in the present invention including amphoteric betaine surfactant compounds having the following general formula:

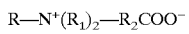

wherein R is a hydrophobic group which is an alkyl group containing from 10 to 22 carbon atoms, preferably from 12 to 18 carbon atoms, an alkylaryl or arylalkyl group containing a similar number of carbon atoms with a benzene ring being treated as equivalent to about 2 carbon atoms, and similar structures interrupted by amido or either linkages; each $R_1$ is an alkyl group containing from 1 to 3 carbon atoms; and $R_2$ is an alkylene group containing from 1 to 6 carbon atoms.

One or more such betaine compounds may be included in the polishes of the invention.

Examples of cationic surfactants which may be used in the present invention include quaternary ammonium compounds and salts thereof, including quaternary ammonium compounds which also have germicidal activity and which may be characterized by the general structural formula:

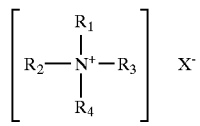

when at least one of $R_1$, $R_2$, $R_3$ and $R_4$ is a hydrophobic, aliphatic, aryl aliphatic or aliphatic aryl group containing from 6 to 26 carbon atoms, and the entire cationic portion of the molecule has a molecular weight of at least 165. The hydrophobic groups may be long-chain alkyl, long-chain alkoxy aryl, long-chain alkyl aryl, halogen-substituted long-chain alkyl aryl, long-chain alkyl phenoxy alkyl or aryl alkyl. The remaining groups on the nitrogen atoms, other than the hydrophobic radicals, are generally hydrocarbon groups usually containing a total of no more than 12 carbon atoms. The radicals $R_1$, $R_2$, $R_3$ and $R_4$ may be straight chain or may be branched, but are preferably straight chain, and may include one or more amide or ester linkages. The radical X may be any salt-forming anionic radical.

Examples of quaternary ammonium salts within the above description include the alkyl ammonium halides such as cetyl trimethyl ammonium bromide, alkyl aryl ammonium halides such as octadecyl dimethyl benzyl ammonium bromide, and N-alkyl pyridinium halides such as N-cetyl pyridinium bromide. Other suitable types of quaternary ammonium salts include those in which the molecule contains either amide or ester linkages, such as octyl phenoxy ethoxy ethyl dimethyl benzyl ammonium chloride and N-(laurylcocoaminoformylmethyl)-pyridinium chloride. Other effective types of quaternary ammonium compounds which are useful as germicides includes those in which the hydrophobic radical is characterized by a substituted aromatic nucleus as in the case of lauryloxyphenyltrimethyl ammonium chloride, cetylaminophenyltrimethyl ammonium methosulphate, dodecylphenyltrimethyl ammonium methosulphate, dodecylphenyltrimethyl ammonium chloride and chlorinated dodecylphenyltrimethyl ammonium chloride.

Preferred quaternary ammonium compounds which act as germicides and which are useful in the present invention include those which have the structural formula:

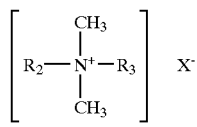

wherein $R_2$ and $R_3$ are the same or different $C_8$–$C_{12}$alkyl, or $R_2$ is $C_{12}$–$C_{16}$alkyl, $C_8$–$C_{18}$alkylethoxy, $C_8$–$C_{18}$alkylphenolethoxy and $R_2$ is benzyl, and X is a halide, for example chloride, bromide or iodide, or methosulphate. The alkyl groups $R_2$ and $R_3$ may be straight chain or branched, but are preferably substantially linear.

A mixture of two or more surface active agents may also be used. Other known surface active agents not particularly described above may also be used. Such surface active agents are described in McCutcheon's Detergents and Emulsifiers, North American Edition, 1982; Kirk-Othmer, Encyclopaedia of Chemical Technology, 3rd Ed., Vol. 22, pp 346–387.

The amount of the surfactant, or of surfactants in total, is preferably up to 10% w/w, more preferably up to 5% w/w.

Suitably, the solvent is present in the polish in an amount providing at least 10% w/w of the polish. Preferably the solvent is present in an amount up to 30% w/w, preferably up to 20% w/w. The solvent is suitably an organic solvent, preferably a petroleum distillate, most preferably one of boiling range 120–200° C. A preferred solvent is EXXSOL D145/160 (trade mark) supplied by Exxon.

The polishes according to the invention may also include additional components, suitably selected from:

antioxidants in an amount of 0.001 to 0.1% w/w, for example sodium benzoate, preservatives in the amount of 0.01 to 0.15% w/w, for example, chloromethylisothiazolinone or benzoisothiazoline-one, anti-static agents, in the amount of 0.001 to 5.0% w/w, perfumes, in the amount of 0.1 to 5.0% w/w, and wood extract oils, for example sandalwood oil, cedar oil or other oils of this nature in an amount of 0.01 to 1.0% w/w.

Such additional components may suitably be present in an amount up to 15% w/w, and preferably up to 8% w/w.

The balance of the polish is water, either being soft or deionised water.

It will be appreciated that polishes according to the invention may be liquid or paste emulsions. However, they are preferably liquid emulsions.

In a preferred formulation according to the present invention, the polish is a liquid emulsion and is designed to be spray dispensed from a container. This may be a trigger spray or an aerosol can. For aerosol dispensing the polish may therefore additionally include from 5.0–40% w/w of a propellant, preferably 10–30% w/w, the propellant preferably being a volatile organic compound having a suitable vapour pressure, for example, propane, butane, isobutane and pentane. It will be appreciated, however, that any typical aerosol propellants, such as halogenated hydrocarbons, dimethyl ethers and compressed gases, for example $CO_2$, $N_2$ and LPG (Liquid Petroleum Gas) may be used. It will be appreciated that one compound may function as the solvent and as the propellant. In such cases the definitions given above for the amount of a propellant which should be present are applicable.

According to a second aspect there is provided a furniture polish for porous surfaces, comprising:

(i) 0.3–4.5% w/w of paraffin wax (ii) 0.05–1% w/w of microcrystalline wax (iii) 0–1% w/w of beeswax (iv) 1–10% w/w of silicone oil (v) 5–30% w/w of an organic solvent (vi) 0–10% w/w of a surfactant (vii) 0–50% w/w of an aerosol propellant, and (viii) 0–15% w/w of additional components, (ix) the balance of the composition being water.

Preferably the polish comprises:

(i) 0.5–1.5% w/w of paraffin wax (ii) 0.1–0.6% w/w of microcrystalline wax (iii) 0.1–0.6% w/w of beeswax (iv) 2–5% w/w of a silicone oil (v) 10–20% w/w of an organic solvent (vi) 0–5% w/w of a surfactant (vii) 0–30% w/w of a propellant and (viii) 0–8% w/w of additional components, (ix) the balance of the composition being water.

According to a third aspect of the present invention, there is provided a dispensing package comprising a polish of the first or second aspect, the dispensing package having a spray nozzle. Preferably the package is non-pressurised and has a trigger spray to emit the polish. Most preferably, however, the package is pressurised and includes a propellant.

According to a fourth aspect of the present invention, there is provided a method of rendering a surface water resistant, the method comprising the step of treating the surface with a polish according to the first or second aspect of the present invention. The surface is suitably a porous surface, especially a wooden surface.

In this specification, unless otherwise stated, percentages refer to the weight of a component, on total weight of the polish (including a solvent and, if present, a separate propellant).

The invention will now be described with reference to the following examples, Example A and Example B.

EXAMPLE A

The furniture polishes defined in Table 1 were produced. Formula A employs a blend of waxes in a composition in accordance with the invention and formulae B-D contain each of the waxes individually. These were compared with a commercially-available furniture polish, formula E, of unspecified proprietary composition.

TABLE 1

Formulae A–D

|  | Formula A | B | C | D |
|---|---|---|---|---|
| Aliphatic hydrocarbon solvent-EXXSOL D145/160 (trade mark) | 14.0 | 14.0 | 14.0 | 14.0 |

TABLE 1-continued

Formulae A–D

|  | Formula A | B | C | D |
|---|---|---|---|---|
| Silicone oil blend, 350–30,000 molecular weight | 3.18 | 3.18 | 3.18 | 3.18 |
| Sorbitan mono oleate | 0.70 | 0.70 | 0.70 | 0.70 |
| Beeswax | 0.25 | 1.45 |  |  |
| Paraffin wax | 0.90 |  | 1.45 |  |
| Microcrystalline wax | 0.30 |  |  | 1.45 |
| Perfume | 0.29 | 0.29 | 0.29 | 0.29 |
| n-Butane | 15.0 | 15.0 | 15.0 | 15.0 |
| Sodium benzoate | 0.04 | 0.04 | 0.04 | 0.04 |
| Benzisothiazoline-one | 0.09 | 0.09 | 0.09 | 0.09 |
| Water | to 100 | to 100 | to 100 | to 100 % w/w |

The beeswax was bleached white beeswax, code X0021, from Poth Hille & Co. Limited, of London, UK. The paraffin wax has CAS No. 8002-74-2. The microcrystalline wax has CAS No. 64742-42-3.

Resistance to Water Mark Test

A clean and dry wooden board (30 cm×30 cm) with a shellac coating was polished using the test formulae as follows. 0.5 g of one of the formulae was applied using a duster. Using an up and down motion the formula was spread over the board from left to right then again from right to left, ensuring complete coverage, using three up and down wipes each way. The duster was turned over, the area was buffed back and forth, using the same motion as was used when applying the formula. The formula was then left to age on the surface for one hour. After one hour a graduated pipette was used to place 1 ml of de-ionised water (at 5° C.) onto the polished section, so as to form a small pool of water in the centre of the polished area. 75 ml of tap water and one ice cube was placed in a 100 ml glass beaker. The beaker was placed over each pool of water, ensuring that all of the water was trapped underneath the beaker. After 7 hours the beaker was removed from the surface. Immediately the surface was wiped as follows: a clean dry duster was wrapped around a rubbing block; using firm strokes the treated area was wiped eight times downwards; then, with a clean duster, the treated area was wiped eight times horizontally across the surface.

The board was left overnight for any white marks to fully form.

The intensity of the white marks were then assessed by a panel of at least 10 people using a scoring system. The results were then assessed statistically.

The following results were obtained.

TABLE 2

Resistance to Water Mark damage

| Formula | White mark resistance relative to formula A |
|---|---|
| Formula B | Significantly worse than A |
| Formula C | Significantly worse than A |
| Formula D | Significantly worse than A |
| Formula E | Significantly worse than A |

The results in Table 2 show that the blend of waxes in Formula A gives better resistance to damage caused by water than does any of the waxes individually. This formula is also better than an excellent commercially available product, formula E.

Smearing Test

A duster was folded around a rubbing block. 0.5 grams of polish were then sprayed onto the top edge of the duster. The duster on the rubbing block was then wiped down the centre of a wooden tile measuring 30 by 30 cm. A clean duster was then wrapped around the rubbing block and the portion of the wooden board to which the polish had been applied was buffed by rubbing up and down five times with the cloth. A panel of at least 10 people was then asked to assess the degree of smearing using a scale of:

4—severe smearing
3—bad smearing
2—moderate smearing
1—slight smearing
0—no smearing The results obtained for the test formulae were then compared statistically using multi-sample analysis of variance. The following results were obtained.

TABLE 3

Smearing caused by using the polishes

| Formula | Smearing relative to A |
| --- | --- |
| Formula B | Significantly more smearing than A |
| Formula C | Significantly more smearing than A |
| Formula D | Significantly more smearing than A |
| Formula E | Significantly more smearing than A |

These show that the blend of waxes represented by formula A gives significantly less smearing than any of the waxes taken individually. Moreover, this formula is better than an excellent commercially available product, formula E.

These results taken together show that the blend of waxes in formula A gives good resistance to the damaging effect of water and avoids the problem of excessive smearing.

EXAMPLE B

The spray-can furniture polish Formula F defined in Table 4 below was produced, using the same ingredients as those stated in Table 1, but some in different amounts, and without beeswax.

TABLE 4

Formula F

| Material | % w/w |
| --- | --- |
| Aliphatic hydrocarbon solvent | 14.00 |
| Silicone oil blend (350–30,000 cps) | 3.18 |
| Sorbitan mono oleate | 0.70 |
| Paraffin wax | 0.90 |
| Microcrystalline wax | 0.30 |
| Perfume | 0.29 |
| n-Butane | 15.00 |
| Sodium benzoate | 0.04 |
| Benzisothiazoline-one | 0.09 |
| Water | to 100 |

The same tests as those described in Example A were run. The polish of the invention, Formula F, was determined to have excellent non-smearing properties compared with a commercial polish not having paraffin wax and microcrystalline wax in combination. Formula F also has good glossing properties and high resistance to water marking.

What is claimed is:

1. A furniture polish, being a liquid emulsion comprising water, a solvent, paraffin wax in an amount of from 0.3–1.5% w/w and microcrystalline wax in an amount of from 0.05–1% w/w.

2. A furniture polish as claimed in claim 1 wherein microcrystalline wax is present in an amount of from 0.1–0.6% w/w.

3. A furniture polish as claimed in claim 1, wherein paraffin wax is present in an amount of from 0.5–1.5% w/w.

4. A furniture polish as claimed in claim 3 wherein microcrystalline wax is present in an amount of from 0.1–0.6% w/w.

5. A furniture polish as claimed in claim 1 wherein beeswax is present in an amount of from 0.05–1% w/w.

6. A furniture polish as claimed in claim 1 wherein the total amount of waxes in the composition is in the range 0.8–2% w/w.

7. A furniture polish as claimed in claim 1, comprising a silicone oil.

8. A method of rendering a furniture surface water resistant, the method comprising treating the surface with a furniture polish as claimed in claim 1.

9. A dispensing package comprising a furniture polish as claimed in claim 1, the dispensing package having a spray nozzle.

10. A dispensing package as claimed in claim 9, wherein the package is non-pressurized and has a trigger spray to emit the furniture polish.

11. A dispensing package as claimed in claim 9, wherein the package is pressurized and the furniture polish includes a propellant.

12. A method of rendering a furniture surface water resistant, the method comprising treating the surface with a dispensing package as claimed in claim 9.

13. A liquid emulsion furniture polish for porous surfaces comprising:
a) 0.3–1.5% w/w of paraffin wax
b) 0.05–1% w/w of microcrystalline wax
c) 0–1% w/w of beeswax
d) 0–10% w/w of a silicone oil
e) 5–30% w/w of an organic solvent
f) 0–10% w/w of a surfactant
g) 0–50% w/w of an aerosol propellant,
h) 0–15% w/w of additional components, and
i) water, to 100%.

14. A furniture polish as claimed in claim 13, comprising:
a) 0.5–1.5% w/w of paraffin wax
b) 0.1–0.6% w/w of microcrystalline wax
c) 0.1–0.6% w/w of beeswax
d) 2–5% w/w of silicone oil
e) 5–30% w/w of an organic solvent
f) 0–5% w/w of a surfactant
g) 0–30% w/w of a aerosol propellant,
h) 0–8% w/w of additional components, and
i) water, to 100%.

* * * * *

UNITED STATES PATENT AND TRADEMARK OFFICE
CERTIFICATE OF CORRECTION

PATENT NO.      : 6,830,609 B2
DATED           : December 14, 2004
INVENTOR(S)     : Bedford et al.

It is certified that error appears in the above-identified patent and that said Letters Patent is hereby corrected as shown below:

<u>Column 8,</u>
Line 7, "microcrystalline wax" should read -- paraffin wax --.
Line 8, "0.1-0.6% w/w" should read -- 0.5-1.5% w/w --.
Line 10, "paraffin wax" should read -- microcrystalline wax --.
Line 10, "0.5-1.5% w/w" should read -- 0.1 – 0.6% w/w --.
Line 11, "claim 3" should read -- claim 2 --.
Lines 21-23, "A method of rendering a furniture surface water resistant, the method comprising treating the surface with a furniture polish as claimed in claim 1" should read -- A liquid emulsion furniture polish for porous surfaces comprising:
a)      0.3 – 1.5% w/w of paraffin wax
b)      0.05 – 1% w/w of microcrystalline wax
c)      0 – 1% w/w of beeswax
d)      1 – 10% w/w of silicone oil
e)      5 – 30% w/w of an organic solvent
f)      0 – 10% w/w of a surfactant
g)      0 – 50% w/w of an aerosol propellant,
h)      0 – 15% w/w of additional components, and
i)      water, to 100%. --.
Lines 24-26, "A dispensing package comprising a furniture polish as claimed in claim 1, the dispensing package having a spray nozzle" should read
-- A furniture polish as claimed in claim 18, comprising:
a)      0.5 – 1.5% w/w of paraffin wax
b)      0.1 – 0.6% w/w of microcrystalline wax
c)      0.1 – 0.6% w/w of beeswax
d)      2 – 5% w/w of silicone oil
e)      5 – 30% w/w of an organic solvent
f)      0 – 5% w/w of a surfactant
g)      0 – 30% w/w of an aerosol propellant,
h)      0 – 8% w/w of additional components, and
i)      water, to 100%. --.

UNITED STATES PATENT AND TRADEMARK OFFICE
CERTIFICATE OF CORRECTION

| | | |
|---|---|---|
| PATENT NO. | : 6,830,609 B2 | |
| DATED | : December 14, 2004 | |
| INVENTOR(S) | : Bedford et al. | |

It is certified that error appears in the above-identified patent and that said Letters Patent is hereby corrected as shown below:

<u>Column 8 (cont'd),</u>
Lines 27-29, "A dispensing package as claimed in claim 9, wherein the package is non-pressurized and has a trigger spray to emit the furniture polish" should read -- A dispensing package comprising a furniture polish as claimed in claim 1, the dispensing package having a spray nozzle --.
Lines 31-32, "package is pressurized and the furniture polish includes a propellant" should read -- package is non-pressurized and has a trigger spray to emit the furniture polish --.
Lines 33-35, "A method of rendering a furniture surface water resistant, the method comprising treating the surface with a dispensing package as claimed in claim 9" should read -- A dispensing package as claimed in claim 10, wherein the package is pressurized and the furniture polish includes a propellant --.
Line 36-48, "A liquid emulsion furniture polish for porous surfaces comprising:
a) 0.3-1.5% w/w of paraffin wax
b) 0.05-1% w/w of microcrystalline wax
c) 0-1% w/w of beeswax
d) 0-10% w/w of a silicone oil
e) 5-30% w/w of an organic solvent
f) 0-10% w/w of a surfactant
g) 0-50% w/w of an aerosol propellant,
h) 0-15% w/w of additional components, and
i) water, to 100%." should read -- A method of rendering a furniture surface water resistant, the method comprising treating the surface with a furniture polish as claimed in claim 1 --.

UNITED STATES PATENT AND TRADEMARK OFFICE
CERTIFICATE OF CORRECTION

PATENT NO. : 6,830,609 B2
DATED : December 14, 2004
INVENTOR(S) : Bedford et al.

It is certified that error appears in the above-identified patent and that said Letters Patent is hereby corrected as shown below:

Column 8 (cont'd),
Line 36, "A furniture polish as claimed in claim 13, comprising:
a) 0.5-1.5% w/w of paraffin wax
b) 0.1-0.6% w/w of microcrystalline wax
c) 0.1-0.6% w/w of beeswax
d) 2-5% w/w of silicone oil
e) 5-30% w/w of an organic solvent
f) 0-5% w/w of a surfactant
g) 0-30% w/w of a aerosol propellant,
h) 0-8% w/w of additional components, and
i) water, to 100%" should read -- A method of rendering a furniture surface water resistant, the method comprising treating the surface with a dispensing package as claimed in claim 10. --.

Signed and Sealed this

Eleventh Day of April, 2006

JON W. DUDAS
*Director of the United States Patent and Trademark Office*